United States Patent [19]
Antelman

[11] Patent Number: 5,089,275
[45] Date of Patent: Feb. 18, 1992

[54] STABILIZED DIVALENT SILVER BACTERICIDES

[75] Inventor: Marvin S. Antelman, Rehovot, Israel

[73] Assignee: N. Jonas & Co., Inc., Bensalem, Pa.

[21] Appl. No.: 697,781

[22] Filed: May 9, 1991

[51] Int. Cl.$^5$ .............................................. C02F 1/50
[52] U.S. Cl. .................................... 424/602; 424/601; 424/618; 514/495; 422/19; 422/28; 210/764; 210/169
[58] Field of Search .................. 210/764, 169; 422/19, 422/28; 424/618, 602, 601, 604; 514/495; 423/42, 45, 544

[56] References Cited

U.S. PATENT DOCUMENTS

| | | | |
|---|---|---|---|
| 4,055,655 | 10/1977 | Maurer et al. | 514/495 |
| 4,092,245 | 5/1978 | Franks et al. | 424/618 |
| 5,017,295 | 5/1991 | Antelman | 210/764 |

*Primary Examiner*—Stanley S. Silverman
*Assistant Examiner*—Neil M. McCarthy
*Attorney, Agent, or Firm*—Salter & Michaelson

[57] ABSTRACT

Solid bactericidal compositions are disclosed based on divalent silver (Ag(II)) as the active sanitized agent. The compositions are prepared by reacting acid liquid Ag(II) complexes with anhydrous calcium sulfate so as to form a solid matrix in which the bactericide is entrapped in the resulting hydrated calcium sulfate. Optimum compositions are described consisting of Ag(II) phosphate dissolved in phosphoric acid where the ratio of solid (by weight) to liquid (by volume) is 5:2. The resulting solid bactericides can be used in water cooling installations. They are capable of causing 100% kills within 10 minutes of *E. Coli* conforms in conformity with EPA protocols, allowing them to quality as swimming pool and hot tub sanitizers. Since the compositions are based on calcium sulfate, they are also suitable as mineralizers, thus providing a dual function.

3 Claims, No Drawings

STABILIZED DIVALENT SILVER BACTERICIDES

BACKGROUND OF THE INVENTION

The present invention relates to methods of stabilizing bactericidally active acid divalent silver (Ag(II)) complexes into solid matrices. Said complexes constitute the subject matter of U.S. Pat. No. 5,017,295 of the present inventor. In said patent, the inventor described the preparation of soluble Ag(II) complexes which are effective bactericides in water utilized for industrial cooling and for swimming pools. Of the various complexes described, the most viable ones were the Ag(II) phosphates. These are prepared by dissolving divalent silver oxide (AgO) in phosphoric acid. It was demonstrated by the inventor in numerous experiments that those conditions which favored the formation of divalent silver ions were most effective bactericides, so that there exists a definite correlation between bactericidal activity and favorable Ag(II) stability in solution. Two conditions that favor Ag(II) ion stability are low pH and the addition of oxidation agents.

These favorable conditions have been described in the chemical literature. The stabilization under acid conditions of Ag(II) ions can be expressed by the following equation:

$$AgO + AG^+ + 2H^+ = 2Ag^{2+} + H_2O$$

Said Ag(II) phosphate complexes are stabilized in concentrated phosphoric acid solution. The handling of said solutions poses a safety hazard to the user who is advised in Material Safety Data Sheets accompanying the product to use gloves and goggles when handling the solution. Furthermore, the shipping of such material requires hazardous labeling as a corrosive substance. Accordingly, it was desired to develop a solid form that could stabilize the Ag(II) acid complexes. After experimenting with a series of solid absorbents, it was found that anhydrous calcium sulfate when mixed in the proper ratio with various Ag(II) acid complexes would stabilize and set into hard plaster-like compositions containing the complexes. These hard compositions could be ground into solid powders giving rise to a viable product. Furthermore, the fact that calcium sulfate performed in this manner added another feature to the product, and that was it could be added directly to swimming pools where calcium chloride is employed as a mineralizing agent, and thus there would be no necessity to add calcium chloride in addition to this sanitizer to the pool.

OBJECT OF THE INVENTION

The main object of this invention is to provide solid stable forms of liquid acid divalent silver bactericides and especially those of Ag(II) phosphate complexes dissolved in phosphoric acid for application to waters used for industrial cooling, swimming pools and hot tubs, and which will also meet the requirements of the last two applications which require that the final product be capable of 100% kills of select coliform strains within 10 minutes. Another object of this invention is to provide for a combined source of bactericide mineralizing agent which can be applied to swimming pool and hot tub water where agents such as calcium chloride are employed.

SUMMARY OF THE INVENTION

This invention relates to methods of stabilizing divalent silver liquid acid bactericides utilized in keeping the water in swimming pools, hot tubs and industrial cooling installations free from bacteria. More particularly, said methods involve the stabilization and solidification of said bactericides into a solid end product which will not lose its efficacy as a bactericide as a result of being incorporated into this new entity.

Divalent silver bactericides were prepared by dissolving varying quantities of AgO in phosphoric acid which in turn was diluted with water to various concentrations. A lesser number of preparations was made from AgO and nitric acid. These preparations were incorporated in various amounts into an intimate physical mixture with anhydrous calcium sulfate. Ultimately, most of the mixtures set into solids which were easily ground into fine powers in an agate mortar.

It was finally discovered that the optimum ratio for evaluating the physical efficacy of these preparations was at a ratio of solid calcium sulfate (in grams) to liquid Ag(II) complex (in cubic centimeters) of 5:2. It was also found that phosphoric acid inhibited the setting time of the sulfate. For example, Ag(II) phosphate in 87 volume percent C.P. phosphoric acid (85%) never set even after a month, and remained a liquid slurry; whereas the same complex in 24 volume percent acid set within 15 minutes. It was also discovered that the addition of electrolytes to the slurries would hasten the setting time. Thus, for example, a 36% phosphoric acid solution containing Ag(II) ions required one hour to set. However, the addition of one gram of potassium sulfate to the slurry achieved solidification within 12 minutes.

Various solid powders formed according to the aforementioned procedures were then checked for their efficacy in killing *E. Coli* bacteria according to EPA protocol AOAC 15th 1990:965:13. The protocol utilizes a culture containing 100K colonies/cc.

Qualification of a sanitizer for human contact in pools and tubs requires that the bactericide exhibit 100% kills within 10 minutes. All the calcium sulfate matrix solids exhibited 100% kills within 5 and 10 minutes, and this was at concentrations of silver as low as 1.4 PPM.

Calculations were carried out to determine optimum mineralization equivalents of the stabilized calcium sulfate powders. Commercial mineralization calls for adding calcium to swimming pools so as to give an equivalent of 300 PPM of calcium carbonate having a molecular weight of 100. Calcium chloride is most often utilized for this purpose. The end product Ag(II) matrices contain calcium sulfate dihydrate as the final solid material. The molecular weight of the dihydrate is 172.2 and of the anhydrous sulfate 136.1. Calcium has an atomic weight of 40.1. The percentage composition of calcium of these compounds (40.1 ÷ molecular weight of the particular calcium salt × 100) indicates that 571 PPM of the solid Ag(II) 5:2 matrix material is equivalent to 300 PPM of calcium carbonate. Solutions were prepared at this concentration. The solid sank to the bottom.

Other objects and features of the present invention will become apparent to those skilled in the art when the present invention is considered in view of the accompanying example. It should, of course, be recognized that the accompanying example illustrates a preferred embodiment of the present invention and is not intended as a means of defining the limits and scope of the present invention.

DESCRIPTION OF THE PREFERRED EMBODIMENT

The following example is given to illustrate a preferred embodiment of my invention.

A solution of Ag(II) phosphate complex was prepared by dissolving AgO containing one gram of silver in 50 cc. of 36 volume percent of 85% C.P. phosphoric acid. Two cubic centimeters of the resulting solution were intimately mixed with 5 grams of anhydrous calcium sulfate to which was then added one gram of anhydrous potassium sulfate. The entire mass was then ground into a fine powder of about 200 mesh in an agate mortar. This powder was evaluated as a bacteriostat at a concentration of 250 PPM. When the aforementioned EPA protocol was employed with *E. Coli* coliforms, 100% kills were obtained after 5 and 10 minutes. The final concentration of silver in said solution was 1.4 PPM. The pH of the solution was preadjusted to 7.5, and 10 PPM of potassium monopersulfate, which is not bactericidal at said concentration, was added to promote equilibria favorable to Ag(II) ions.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. A solid bactericidal composition for sanitizing the water of swimming pools, hot tubs and industrial cooling installations which comprises a liquid acid divalent silver complex that has been reacted with anhydrous calcium sulfate so as to form a hydrated solid matrix.

2. The composition of claim 1, where the divalent silver complex is a phosphate and the liquid acid is phosphoric acid.

3. The composition of claim 1, where the solid matrix also serves as a calcium mineralizing agent.

* * * * *

UNITED STATES PATENT AND TRADEMARK OFFICE
CERTIFICATE OF CORRECTION

PATENT NO. : 5,089,275
DATED : Feb. 18, 1992
INVENTOR(S) : Antelman, Marvin S.

It is certified that error appears in the above-identified patent and that said Letters Patent is hereby corrected as shown below:

In the Abstract, line 13, change "quality" to --qualify--.

Column 1, line 19, after "were" insert --yielding the--.

Column 2, line 20, change "powers" to --powders--.

Column 1, line 27, change "$AgO^+ + Ag^+ + 2H^+ = 2Ag^{2+} + H_2O$" to --$AgO^- + Ag^+ + 2H^+ = Ag^{2+} + H_2O$--.

Signed and Sealed this

Twenty-fifth Day of January, 1994

Attest:

BRUCE LEHMAN

*Attesting Officer*   *Commissioner of Patents and Trademarks*